United States Patent
Liu et al.

(10) Patent No.: US 8,945,338 B2
(45) Date of Patent: Feb. 3, 2015

(54) ANAEROBIC CURABLE COMPOSITIONS

(71) Applicant: Henkel Corporation, Rocky Hill, CT (US)

(72) Inventors: Jianping Liu, South Glastonbury, CT (US); Andrus Maandi, Rocky Hill, CT (US)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/839,785

(22) Filed: Mar. 15, 2013

(65) Prior Publication Data

US 2014/0262022 A1    Sep. 18, 2014

(51) Int. Cl.
*C09J 11/06*    (2006.01)

(52) U.S. Cl.
CPC ........................... *C09J 11/06* (2013.01)
USPC ........... 156/332; 523/176; 524/313; 524/318; 524/773

(58) Field of Classification Search
CPC ......... C09J 4/00; C09J 191/00; C09J 191/005
USPC .......... 523/176; 524/306, 311, 312, 313, 315, 524/318, 322
See application file for complete search history.

(56) References Cited

U.S. PATENT DOCUMENTS

| | | | |
|---|---|---|---|
| 3,547,851 A * | 12/1970 | Frauenglass | 524/317 |
| 5,605,999 A | 2/1997 | Chu et al. | |
| 6,391,993 B1 | 5/2002 | Attarwala et al. | |
| 6,835,762 B1 | 12/2004 | Klemarczyk et al. | |
| 6,897,277 B1 | 5/2005 | Klemarczyk et al. | |
| 6,958,368 B1 | 10/2005 | Klemarczyk et al. | |
| 2005/0107499 A1* | 5/2005 | Georgeau et al. | 524/59 |
| 2009/0110835 A1* | 4/2009 | Pressley et al. | 427/331 |

FOREIGN PATENT DOCUMENTS

WO    9901484    1/1999

OTHER PUBLICATIONS

English Abstract of JP S56-100876 to Fujita et al. (Aug. 13, 1981).*
R.D. Rich. "Anaerobic Adhesives" in Handbook of Adhesive Technology, 29, 467-79, A. Pizzi and K.L., Mittal, eds., Marcel Dekker, Inc., New York (1994).

* cited by examiner

Primary Examiner — Vu A Nguyen

(74) Attorney, Agent, or Firm — Steven C. Bauman

(57) ABSTRACT

The invention provides anaerobic curable compositions, and methods of their production and use. These compositions provide excellent adhesion especially on oily surfaces.

22 Claims, No Drawings

ANAEROBIC CURABLE COMPOSITIONS

BACKGROUND

1. Field

The invention provides anaerobic curable compositions, and methods of their production and use.

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Furthermore, it is well known that adhesion on oily surfaces is difficult. For example, anaerobic thread locker products have been used extensively to lock various bolts and nuts to prevent them from becoming loose during use. In general, anaerobic thread locker products offer good curing speed and produce required torque strength after cure on ferrous metal surfaces. However, when the bolts and nuts are made with steel and they remain covered with oil, the curing speed of a medium strength anaerobic adhesive, for instance, may be compromised and the torque strength of the cured anaerobic adhesive may not be optimal. It would be a significant commercial advantage if the cure speed and torque strength could be improved.

SUMMARY

In one aspect, the invention provides an anaerobically curable composition, which includes:
(a) at least one (meth)acrylate component;
(b) an anaerobic cure system; and
(c) a biodegradable oleaginous plasticizer.

The invention provides in another aspect a method for using an anaerobically curable composition. Here, the method includes:
providing an anaerobically curable composition comprising at least one (meth)acrylate component, an anaerobic cure system, and a biodegradable oleaginous plasticizer;
providing two or more substrates, each of which having at least one complimentary surface;
applying the anaerobically curable composition to at least one of the complimentary surfaces of the substrates; and
mating the complimentary surfaces of the substrates such that the anaerobically curable composition is disposed therebetween such that an anaerobic environment is present so as to permit the anaerobically curable composition.

In another aspect, this invention provides a method of bonding an oily surface comprising the steps of:
(a) providing an adhesive composition comprising;
  (i) at least one (meth)acrylate component;
  (ii) a cure system; and
  (iii) a biodegradable oleaginous plasticizer;
(b) applying composition to an oily surface of a substrate;
(c) mating said substrate with another substrate; and
(d) permitting said composition to cure.

DETAILED DESCRIPTION

As noted above, the invention provides in one aspect an anaerobically curable composition, which includes:
(a) at least one (meth)acrylate component;
(b) a cure system; and
(c) a biodegradable oleaginous plasticizer.

The invention provides in another aspect a method for using an anaerobically curable composition. Here, the method includes:
providing an anaerobically curable composition comprising
(a) at least one (meth)acrylate component;
(b) a cure system; and
(c) a biodegradable oleaginous plasticizer;
providing two or more substrates, each of which having at least one complimentary surface;
applying the anaerobically curable composition to at least one of the complimentary surfaces of the substrates; and
mating the complimentary surfaces of the substrates such that the anaerobically curable composition is disposed therebetween such an anaerobic environment is present so as to permit the anaerobically curable composition.

(Meth)acrylate monomers suitable for use as the (meth)acrylate component in the present invention may be chosen from a wide variety of materials, such as these represented by $H_2C=C(G)CO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

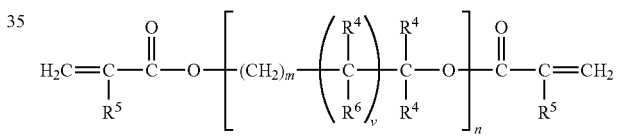

where $R^4$ may be selected from hydrogen, alkyl groups having from 1 to about 4 carbon atoms, hydroxyalkyl groups having from 1 to about 4 carbon atoms or

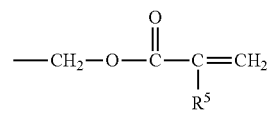

$R^5$ may be selected from hydrogen, halogen, and alkyl groups of from 1 to about 4 carbon atoms;
$R^6$ may be selected from hydrogen, hydroxy and

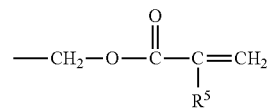

m is an integer equal to at least 1, e.g., from 1 to about 8 or higher, for instance, from 1 to about 4;
v is 0 or 1; and
n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein in its entirety by reference.

Of course, combinations of these (meth)acrylate monomers may also be used.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran(meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Of course, combinations of these (meth)acrylate monomers may also be used.

The (meth)acrylate component comprises generally from about 10 to about 90 percent by weight of the total composition, preferably about 50 to about 90 percent by weight, and typically about 55 percent by weight percent to about 85 percent by weight percent, based on the total weight of the composition.

The cure system is selected from the group consisting of anaerobic cure systems, photocuring systems, heat curing systems, moisture curing systems and suitable combinations thereof.

The cure system used in the inventive method and composition comprises at least one cure initiator and at least one cure accelerator.

Examples of suitable cure initiators are tetramethylbutyl hydroperoxide, tert-amylhydroperoxide, tetrahydroquinoline and alkylated tetrahydroquinoline, such as methyl tetrahydroquinoline.

Examples of suitable cure accelerators are those listed, for example, in U.S. Pat. No. 6,835,762 (Klemarczyk), U.S. Pat. No. 6,897,277 (Klemarczyk) and U.S. Pat. No. 6,958,368 (Klemarczyk).

More specifically, the components of the cure system comprise cumene hydroperoxide, tetramethylbutyl hydroperoxide and/or tert-amylhydroperoxide, tetrahydroquinoline and/or alkylated tetrahydroquinoline, each in an amount effective to trigger anaerobic cure when exposed to conditions substantially devoid of oxygen. Anaerobic cure for a period of time of 24 hours at room temperature ordinarily achieves at least about 80 percent of the ultimate strength of the cured composition.

The effective amount of the components of the cure system should be in the range of 0.1 to 5.0 percent by weight of the total composition. Each of the cure initiator and cure accelerator may be present in amounts of 0.1 percent to about <5 percent by weight (e.g. 0.1 percent by weight to about 3 percent by weight) of the total composition but their total weight together does not exceed 0.1 percent by weight to about 5 percent by weight of the total composition.

In an aspect, the cure system is an anaerobic cure system.

Thus, in another aspect, the invention provides a method for preparing an anaerobically curable composition. In this aspect, the method includes:

(a) at least one (meth)acrylate component;
(b) an anaerobic cure system; and
(c) a biodegradable oleaginous plasticizer. The invention provides in another aspect a method for using an anaerobically curable composition. Here, the method includes:
providing an anaerobically curable composition comprising
(a) at least one (meth)acrylate component;
(b) an anaerobic cure system; and
(c) a biodegradable oleaginous plasticizer;
providing two or more substrates, each of which having at least one complimentary surface;
applying the anaerobically curable composition to at least one of the complimentary surfaces of the substrates; and
mating the complimentary surfaces of the substrates such that the anaerobically curable composition is disposed therebetween such an anaerobic environment is present so as to permit the anaerobically curable composition.

The invention provides in another aspect an anaerobically curable composition. The composition includes:
(a) at least one (meth)acrylate component;
(b) an anaerobic cure system; and
(c) a biodegradable oleaginous plasticizer.

The biodegradable oleaginous plasticizer may be typically an oil component. Examples of suitable oil components are soybean oil or an alkyl ester of soybean oil, canola oil or an alkyl ester of canola oil (such as, for example, alkyl esters where the alkyl group has from 1 to about 4 carbon atoms). An example alkyl ester is a methyl ester of soybean oil. Non-limiting examples are SoyGold 1000, SoyGold 1100, CanolaGold 1000, SoyClear 1500. All these products are available commercially from Ag Environmental Products LLC, Omaha, Nebr. The advantages of these products include properties such as bio-based origin, biodegradability, non-toxicity and low VOC. These products are known for their use as solvents and biodiesel. Applicants have found that use of these materials as plasticizers in medium strength anaerobic thread locker products is novel and provides good curing speed even on oily surfaces (e.g., oily steel surfaces) while maintaining good breakloose or breakaway torque strengths for the cured anaerobic thread locker products on these surfaces.

The biodegradable oleaginous plasticizer may be present in amounts of about 1.0 percent to about 40.0 percent by weight of the total composition, preferably about 1 percent to about 35 percent, and typically about 2 percent to about 35 percent, by weight of the total composition.

Thus, in another aspect, the invention discloses an aerobic composition comprising:
(i) a (meth)acrylate component in the amount of about 50 percent to about 90 percent by weight of the total composition;
(ii) an anaerobic cure system in the amount of about 0.1 percent to about 5.0 percent by weight of the total composition; and
(iii) a biodegradable oleaginous plasticizer, such as a soybean oil component, in an amount of about 1.0 percent to about 40.0 percent by weight of the total composition.

In another aspect, this invention discloses a method of preparing an adhesive composition said method comprising:
(a) forming a composition comprising:
(i) at least one (meth)acrylate component in the amount of about 50 percent to about 90 percent by weight of the total composition; and
(ii) an anaerobic cure system in the amount of about 0.1 percent to about 5.0 percent by weight of the total composition; and (b) combining said composition with a biodegradable oleaginous plasticizer, such as a soybean oil component, in an amount of 1.0 percent to about 40.0 percent.

In yet another aspect, this invention discloses a method of bonding an oily surface comprising the steps of:
(a) providing an adhesive composition comprising;
  (i) at least one (meth)acrylate component in the amount of about 50 percent by weight to about 90 percent by weight of the total composition;
  (ii) an anaerobic cure system in the amount of about 0.1 percent to about 5.0 percent by weight of the total composition; and
  (iii) a biodegradable oleaginous plasticizer, such as a soybean oil component, in an amount of about 1.0 percent to about 40.0 percent by weight of the total composition;
(b) applying the composition to an oily surface of a substrate;
(c) mating the substrate with another substrate; and
(d) permitting the composition to cure.

In yet another aspect, additional components that have been included in traditional anaerobic curable compositions to alter the physical properties of either the curable compositions or the reaction products thereof may be included in the present compositions and methods also.

For instance, one or more of maleimide components, thermal resistance-conferring coreactants, diluent components (diluents) reactive at elevated temperature conditions, mono- or poly-hydroxyalkanes, polymeric plasticizers, coloring agents, thickeners and chelators (see International Patent Application No. PCT/US98/13704; U.S. Pat. No. 6,391,993, the disclosure of which is hereby expressly incorporated herein in its entirety by reference) may be included to modify the physical property and/or cure profile of the formulation and/or the strength or temperature resistance of the cured adhesive.

When used, the maleimide, coreactant, reactive diluent, plasticizer, mono- or poly-hydroxyalkanes, coloring agents, thickeners and/or chelators may be present in an amount generally in the range of about 0.001 weight percent to about 30 weight percent, desirably in the range of 0.001 weight percent to about 10 weight percent and typically in the range of 0.005 weight percent to about 5 weight percent, based on the total weight of the composition.

The inventive compositions may also include other conventional components, such as free radical initiators, free radical accelerators, inhibitors of free radical generation, as well as metal catalysts, such as iron and copper.

A number of well-known initiators of free radical polymerization are typically incorporated into anaerobic curable compositions including hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

EXAMPLES

Five samples (containing biodegradable oleaginous plasticizers) were evaluated (Sample Nos. 2, 4, 5, 6 and 7 in Table 1) and compared against comparison samples (without a biodegradable oleaginous plasticizer; Sample Nos. 1 and 3 in Table 1). Table 1 shows the constituents of the formulations:

TABLE 1

| Sample No | Component | Amount | Note |
|---|---|---|---|
| 1 | Polyethyleneglycol Dimethacrylate | 38.76 | No |
|   | Ethoxylated Bisphenol A Dimethacrylate | 40.00 | biodegradable |
|   | stabilizers | 0.70 | oleaginous |
|   | polymeric plasticizer, (hexanedioic acid, polymer with 1,4-butanediol, 1,3-propanediol, 2,2-dimethyl and isononanol) | 15.00 | plasticizer for comparison |
|   | anaerobic cure-inducing composition | 2.94 | |
|   | polyethylene powder | 2.50 | |
|   | blue dye | 0.07 | |
|   | fluorescent dye | 0.03 | |
| 2 | Polyethyleneglycol Dimethacrylate | 38.76 | SoyGold 1000 |
|   | Ethoxylated Bisphenol A Dimethacrylate | 40.00 | |
|   | Stabilizers | 0.70 | |
|   | SoyGold 1000 | 15.00 | |
|   | anaerobic cure-inducing composition | 2.94 | |
|   | polyethylene powder | 2.50 | |
|   | blue dye | 0.07 | |
|   | fluorescent dye | 0.03 | |
| 3 | Polyethyleneglycol Dimethacrylate | 95.45 | No |
|   | stabilizers | 1.37 | biodegradable |
|   | anaerobic cure-inducing composition | 3.08 | oleaginous |
|   | blue dye | 0.07 | plasticizer for |
|   | fluorescent dye | 0.03 | comparison |
| 4 | Polyethyleneglycol Dimethacrylate | 74.30 | SoyGold 1000 |
|   | stabilizers | 1.37 | |
|   | Soygold 1000 | 21.15 | |
|   | anaerobic cure-inducing composition | 3.08 | |
|   | blue dye | 0.07 | |
|   | fluorescent dye | 0.03 | |
| 5 | Polyethyleneglycol Dimethacrylate | 74.30 | SoyGold 1100 |
|   | stabilizers | 1.37 | |
|   | Soygold 1100 | 21.15 | |
|   | anaerobic cure-inducing composition | 3.08 | |
|   | blue dye | 0.07 | |
|   | fluorescent dye | 0.03 | |

TABLE 1-continued

| Sample No | Component | Amount | Note |
|---|---|---|---|
| 6 | Polyethyleneglycol Dimethacrylate | 74.30 | SoyClear 1500 |
|   | stabilizers | 1.37 | |
|   | SoyClear 1500 | 21.15 | |
|   | anaerobic cure-inducing composition | 3.08 | |
|   | blue dye | 0.07 | |
|   | fluorescent dye | 0.03 | |
| 7 | Polyethyleneglycol Dimethacrylate | 74.30 | CanolaGold 110 |
|   | stabilizers | 1.37 | |
|   | CE110 | 21.15 | |
|   | anaerobic cure-inducing composition | 3.08 | |
|   | blue dye | 0.07 | |
|   | fluorescent dye | 0.03 | |

Improved Strength on Oily Surfaces:

Oily steel bolt and nuts were made by following steps:
1. The steel bolts and nuts were degreased by aqueous cleaner, water rinsed, and dried at elevated temperature.
2. The degreased steel bolts and nuts were immersed in 15 percent of oil in water for 30 seconds.
3. The re-oiled bolts and nuts were placed in an 80° C. oven for 30 min to dry.
4. The bolts and nuts were left at room temperature to cool down.

Comparison:

The oily steel bolts and nuts were assembled together with prepared anaerobic thread locker Loctite 242 (available commercially from Henkel Corporation, Rocky Hill, Conn.). Loctite 242 is a medium strength anaerobic thread locker which does not have good curing speed on stainless steel or oily steel surface and the breakaway or breakloose torque strengths of cured Loctite 242 on these surfaces are also low. Thus, this was used for reference. The assembled bolts and nuts were left at room temperature to cure for 1 hour and 24 hours, respectively. Breakaway or breakloose torque strengths were measured on the cured bolts and nuts at the end of 1 hour and 24 hours.

Inventive Composition with Plasticizer:

The thread locker product, Loctite 242, was reformulated using SoyGold 1000, SoyGold 1100, CanolaGold 110, or SoyClear 1500 as plasticizer, according to the present invention. The oily steel bolts and nuts were assembled together with the thus-reformulated Loctite 242. The assembled bolts and nuts were left at room temperature to cure for 1 hour and 24 hours, respectively. Breakaway or breakloose torque strengths were measured on the cured bolts and nuts at the end of 1 hour and 24 hours.

The performances of these products were compared based on the breakaway or breakloose torque test results which are shown in Tables 2 and 3.

TABLE 2

| | Degreased steel bolts and nuts | | LAB OIL 72-D on steel bolts and nuts | | ELF EVOLUTION SXR (5W-30) oil on steel bolts and nuts | | |
|---|---|---|---|---|---|---|---|
| | Break-loose | Average Prevail | Break-loose | Average Prevail | Break-loose | Average Prevail | Note |
| 1 hr Breakloose (in-lbs) | | | | | | | |
| Loctite 242 | 98 | 18 | | | 58 | 3 | |
| Loctite 2400NA | 85 | 5 | 39 | 4 | 59 | 6 | |
| 1 | 134 | 45 | 68 | 9 | 48 | 33 | No biodegradable oleaginous plasticizer for comparison |
| 2 | 116 | 58 | 86 | 10 | 87 | 14 | SoyGold 1000 |
| 24 hr Breakloose (in-lbs) | | | | | | | |
| Loctite 242 | 148 | 38 | | | 88 | 23 | |
| Loctite 2400NA | 156 | 27 | 80 | 3 | 88 | 17 | |
| 1 | 173 | 85 | 72 | 36 | 63 | 38 | No biodegradable oleaginous plasticizer for comparison |
| 2 | 178 | 58 | 116 | 15 | 134 | 42 | SoyGold 1000 |

TABLE 3

| 1 hr | Degreased steel bolts and nuts | | Aquasafe 21 OIL on steel bolts and nuts | | |
|---|---|---|---|---|---|
| Breakloose (in-lbs) | Breakloose | Average Prevail | Breakloose | Average Prevail | Note |
| Loctite 242 | 98 | 18 | 64 | 4 | |
| 3 | 116 | 261 | 58 | 48 | No biodegradable oleaginous plasticizer for comparison |
| 4 | 157 | 67 | 89 | 36 | SoyGold 1000 |
| 5 | 134 | 70 | 94 | 44 | SoyGold 1100 |
| 6 | 142 | 55 | 93 | 32 | SoyClear 1500 |
| 7 | 150 | 67 | 88 | 35 | CanolaGold 110 |

| 24 hr | Degreased steel bolts and nuts | | Aquasafe 21 OIL on steel bolts and nuts | | |
|---|---|---|---|---|---|
| Breakloose (in-lbs) | Breakloose | Average Prevail | Breakloose | Average Prevail | Note |
| Loctite 242 | 148 | 38 | 94 | 21 | |
| 3 | 107 | 243 | 59 | 62 | No biodegradable oleaginous plasticizer for comparison |
| 4 | 196 | 61 | 124 | 50 | SoyGold 1000 |
| 5 | 179 | 63 | 123 | 39 | SoyGold 1100 |
| 6 | 151 | 66 | 119 | 40 | SoyClear 1500 |
| 7 | 152 | 66 | 120 | 51 | CanolaGold 110 |

As Tables 2 and 3 show, when the medium strength anaerobic thread locker product Loctite 242 was reformulated using SoyGold 1000, SoyGold 1100, CanolaGold 110, or SoyClear 1500 as plasticizer, the anaerobic thread locker products performed better on oily steel surfaces, providing good curing speed and meeting the specified torque strength for the medium strength thread locker products. The Reference (un-reformulated) Loctite 242 did not perform well on both surfaces as expected, thus demonstrating that the plasticizer SoyGold 1000, SoyGold 1100, CanolaGold 110 or SoyClear 1500 when formulated into medium strength thread locker products can provide good curing speed on oily steel surfaces. The break strength of the cured composition after 24 hours on oily nut/bolt assembly ranged from about 80 to about 180 inch-pounds. The prevail strength of the cured composition after 24 hours on an oily nut/bolt assembly ranged from about 25 to about 80 inch-pounds. The cured thread locker products also meet the breakaway or breakloose torque strengths specified for medium strength anaerobic adhesives.

The invention claimed is:

1. An anaerobically curable composition comprising:
   at least one (meth)acrylate component;
   an anaerobic cure system; and
   a biodegradable oleaginous plasticizer.

2. The composition of claim 1, wherein the biodegradable oleaginous plasticizer comprises a soybean oil component.

3. The composition of claim 1, wherein the biodegradable oleaginous plasticizer is an alkyl ester of soybean oil.

4. The composition of claim 1, wherein the (meth)acrylate component is represented by $H_2C=C(G)CO_2R^1$, wherein G is a member selected from the group consisting of H, halogen and alkyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

5. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran(meth)acrylates and di(meth)acrylates, hydroxypropyl(meth)acrylate, hexanediol di(meth)acrylate, and trimethylol propane tri(meth)acrylate.

6. The composition of claim 1, wherein the biodegradable oleaginous plasticizer is present in an amount of about 1.0 percent to about 40.0 percent by weight of the total composition.

7. The composition of claim 1, wherein the (meth)acrylate component is present in an amount of about 50 percent to about 90 percent by weight of the total composition.

8. The composition of claim 1, further comprising a material selected from the group consisting of thickeners, coloring agents, chelators, diluents and combinations thereof.

9. An anaerobic composition comprising:
   a (meth)acrylate component in the amount of about 50 percent to about 90 percent by weight of the total composition;
   an anaerobic cure system; and
   a biodegradable oleaginous plasticizer in an amount of about 1.0 percent to about 40.0 percent by weight of the total composition.

10. The composition of claim 9, wherein the anaerobic cure system comprises a cure initiator in the amount of 0.1 percent to about 5 percent by weight of the total composition and a cure accelerator in the amount of about 0.1 percent to about 5 percent by weight of the total composition.

11. The composition of claim 9, wherein the biodegradable oleaginous plasticizer comprises an alkyl ester of soybean oil.

12. The composition of claim 9, wherein the biodegradable oleaginous plasticizer is a methyl ester of soybean oil.

13. The composition of claim 12, wherein the methyl ester of soybean oil is present in an amount of about 1 percent to about 15 percent by weight of the total composition.

14. The composition of claim 1, wherein the break strength of the cured composition after 24 hours on oily nut/bolt assembly is about 80 to about 180 inch-pounds.

15. The composition of claim 1, wherein the prevail strength of the cured composition after 24 hours on an oily nut/bolt assembly is about 25 to about 80 inch-pounds.

16. The composition of claim 9, further comprising a material selected from the group consisting of thickeners, coloring agents, chelators, diluents and combinations thereof.

17. A method of preparing an adhesive composition comprising:
 forming a composition comprising at least one (meth)acrylate component and a cure system; and
 combining said composition with a biodegradable oleaginous plasticizer in an amount of 1.0 percent to about 40.0 percent by weight of the total composition.

18. The method of claim 17, wherein said biodegradable oleaginous plasticizer is an alkyl ester of soybean oil.

19. A method of bonding oily surfaces comprising the steps of:
 providing an adhesive composition comprising;
  at least one (meth)acrylate component;
  a cure system; and
  a biodegradable oleaginous plasticizer;
 applying said composition to an oily surface of a substrate;
 mating said substrate with another substrate; and
 permitting said composition to cure.

20. The method of claim 19, wherein the oily substrate surface is constructed from a material selected from zinc, steel, stainless steel, cadmium and combinations thereof.

21. The method of claim 19, wherein the oily substrate is a nut or bolt.

22. A method for using an anaerobically curable composition, said method comprising the steps of:
 (a) providing an anaerobically curable composition in accordance with claim 1;
 (b) providing two or more substrates, each of which having at least one complimentary surface;
 (c) applying said anaerobically curable composition to at least one of said complimentary surfaces of the substrates; and
 (d) mating said complimentary surfaces of the substrates such that said anaerobically curable composition is disposed therebetween in an anaerobic environment and permitting said anaerobically curable composition to cure.

* * * * *

UNITED STATES PATENT AND TRADEMARK OFFICE
CERTIFICATE OF CORRECTION

PATENT NO.        : 8,945,338 B2                                Page 1 of 1
APPLICATION NO.   : 13/839785
DATED             : February 3, 2015
INVENTOR(S)       : Jianping Liu et al.

It is certified that error appears in the above-identified patent and that said Letters Patent is hereby corrected as shown below:

Title page, under (72) Inventors:, Insert

--Andrew D. Messana
Lynnette Hurlburt
Joel D. Schall--

Signed and Sealed this
Twenty-fifth Day of August, 2015

Michelle K. Lee
*Director of the United States Patent and Trademark Office*